United States Patent [19]
Seireg et al.

[11] Patent Number: 5,544,056
[45] Date of Patent: Aug. 6, 1996

[54] COMPUTERIZED CONTROL OF AUTOMOBILE SPEED

[76] Inventors: Ali A. Seireg, 219 DuRose Terrace, Madison, Wis. 53705; David B. Dooner, P.O. Box 109, Quincy, Fla. 32351

[21] Appl. No.: 376,900

[22] Filed: Jan. 23, 1995

[51] Int. Cl.⁶ .................... G06F 7/70; G06G 7/70
[52] U.S. Cl. .................... 364/426.04; 364/424.1; 364/431.07; 477/108; 180/178; 180/179
[58] Field of Search ............. 364/424.01, 424.1, 364/431.07, 426.04, 426.01, 565, 566; 477/108–109, 155, 80, 48, 32, 121, 905; 192/3.58, 4 B; 123/344, 340, 341, 352, 360, 389, 478, 436, 377; 74/474, 479.01, 481, 483 R; 475/128, 116, 123; 180/176–179, 197, 165.1, 109; 303/20, 10–13, 115.4, 3; 73/126, 117, 113; 235/88 R, 78 R

[56] References Cited

U.S. PATENT DOCUMENTS

| | | | |
|---|---|---|---|
| 3,744,849 | 7/1973 | Jonason et al. | 303/109 |
| 3,979,950 | 9/1976 | Maxwell | 73/126 |
| 4,047,507 | 9/1977 | Noguchi et al. | 123/344 |
| 4,480,728 | 11/1984 | Bailey et al. | 192/4 B |
| 4,680,453 | 7/1987 | Pugh | 235/88 R |
| 4,716,872 | 1/1988 | Pol | 123/352 |
| 5,136,495 | 8/1992 | Tokoro et al. | 364/424.1 |
| 5,193,062 | 3/1993 | Murase et al. | 364/426.04 |
| 5,197,562 | 3/1993 | Kakinami et al. | 364/426.04 |
| 5,218,540 | 6/1993 | Ishikawa et al. | 364/424.1 |
| 5,226,351 | 7/1993 | Matsuoka et al. | 477/32 |
| 5,233,880 | 8/1993 | Sato et al. | 74/474 |
| 5,249,482 | 10/1993 | Okahara et al. | 477/48 |
| 5,249,658 | 10/1993 | Goeckner et al. | 192/3.58 |
| 5,305,663 | 4/1994 | Leonard et al. | 477/155 |
| 5,305,665 | 4/1994 | Sano et al. | 475/128 |
| 5,307,270 | 4/1994 | Graf | 364/424.1 |

Primary Examiner—Kevin J. Teska
Assistant Examiner—Jacques H. Louis-Jacques
Attorney, Agent, or Firm—Edward M. Livingston, Esq.

[57] ABSTRACT

A speed selector (24, 25, 40) actuates a computer (32, 35, 38, 39) to calculate optimum engine speed, speed-change rate and gear ratio for achieving a selected speed of a motor vehicle (18). An actuator (36) then accomplishes throttling of an engine (19) with a throttling means (20) and gear changes of a transmission (21) as necessary to achieve the selected vehicle speed with least-possible fuel consumption and exhaust smog. When a desired change in speed is made, it is maintained in a cruise-control mode with optimized rates of change of throttling and gear-shifting for necessary changes in engine speed for varying terrain and driving conditions.

16 Claims, 2 Drawing Sheets

COMPUTERIZED CONTROL OF AUTOMOBILE SPEED

BACKGROUND OF THE INVENTION

This invention relates to throttling, shifting gears, controlling smog, maximizing fuel efficiency and controlling speed of automotive vehicles. In particular, it relates to computerized methods and means for optimizing engine speed, gear ratio and acceleration rate for achieving and maintaining desired vehicle speeds.

High rates of pollution and fuel consumption per distance of travel in vehicles occur when engines that power the vehicles are either under-throttled or over-throttled for changes in speed. The engines do not function as efficiently. Consequently, a large portion of smog could be eliminated and fuel could be saved by optimizing engine speed and rate of change of engine speed in proportion to desired speeds of vehicles.

Previously, means for shifting gears and changing engine speeds of automobiles have been operated separately. Optimization of speed of the engine in proportion to speed of the vehicle and horsepower required have been left to drivers. Most drivers have little if any knowledge for optimizing speed of an engine for achieving and maintaining desired vehicle speeds. Throttling means are inadequate and engine performance factors are not detectable for the small portion of drivers who are knowledgeable and capable of optimizing engine speed per vehicle speed and power required. All drivers are left to change and to control engine speeds with means that are largely independent of engine efficiency per vehicle speed and gear ratio of automotive vehicles. All known speed-control and shift-control means leave drivers to determine performance efficiency of engines and to change engine speeds in proportion to vehicle speeds and gear ratios within wide ranges of operating conditions.

Examples of gear-changing means and throttling means separately from optimization of engine speeds are voluminous. In addition to basic throttling devices for carburetors and injectors in combination with either manual or automatic shifting means, some of the more recent means and methods for controlling engine speed and shifting independently of performance efficiency of engines are described in the following patent documents:

U.S. Pat. No. 5,305,663, granted to Leonard, et al. on Apr. 26, 1994, describes a "geared transmission adapted to deliver torque from a throttle-controlled engine to a drive shaft" without reference to throttle control for efficiency of the engine per vehicle speed, engine speed and engine power. Nor do prior-art patents to which it is related and to which it refers.

U.S. Pat. No. 5,305,665, granted to Sano, et al. on Apr. 26, 1994, describes a "control device for an automatic transmission" without addressing optimization of engine speed and power apart from what is achieved by automatic gearing in response to independent throttling by a driver of a vehicle.

U.S. Pat. No. 5,218,540, granted to Ishikawa, et al. on Jun. 8, 1993, provides methods for controlling a continuously variable transmission in relation to a throttle valve for optimizing control of engine power independently of fuel efficiency and exhaust smog of the engine.

U.S. Pat. No. 5,233,880, granted to Sato, et al. on Aug. 10, 1993, teaches control of a stepless transmission, such as a belt drive, without reference to engine efficiency and smog factors.

U.S. Pat. No. 5,249,482 granted to Okahara, et al. on Oct. 5, 1993, teaches system and methodology for controlling a continuously variable transmission with means for overriding automation factors, resulting in decrease rather than increase in engine efficiency.

U.S. Pat. No. 5,226,351 granted to Matsuoka, et al. on Jul. 13, 1993, provides shifting control related to rate of intake air which can be more detrimental than advantageous to engine efficiency and exhaust smog in relation to speed conditions.

SUMMARY OF THE INVENTION

In light of problems that have existed and that continue to exist in optimizing engine efficiency and minimizing exhaust smog in driving conditions, objectives of this invention are to provide a computerized method and system for controlling automobile speed variation and shifting which:

Causes automotive vehicles to attain selected speeds with optimal engine power for minimizing fuel consumption and exhaust smog of engines that power the vehicles;

Controls shifting of continuously variable transmission in relation to vehicle speed and engine speed to maximize fuel efficiency and to minimize exhaust smog;

Maintains vehicle speed constantly while changing engine speed and gear ratio as necessary for maximizing fuel efficiency and minimizing exhaust smog;

Increases engine life of automotive vehicles; and

Enhances smoothness of ride during speed-change and speed-maintenance conditions of motor vehicles.

This invention accomplishes the above and other objectives with a speed selector which actuates a computer to calculate optimum engine speed, speed-change rate and gear ratio for achieving a selected vehicle speed. An actuator then accomplishes throttling and gear changes as necessary to achieve the selected vehicle speed with least-possible fuel consumption and exhaust smog. When a desired change in speed is made, it is maintained in a cruise-control mode with optimized rates of change of throttling and gear-shifting for necessary changes in engine speed for varying terrain and driving conditions.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENT

Figure 1:
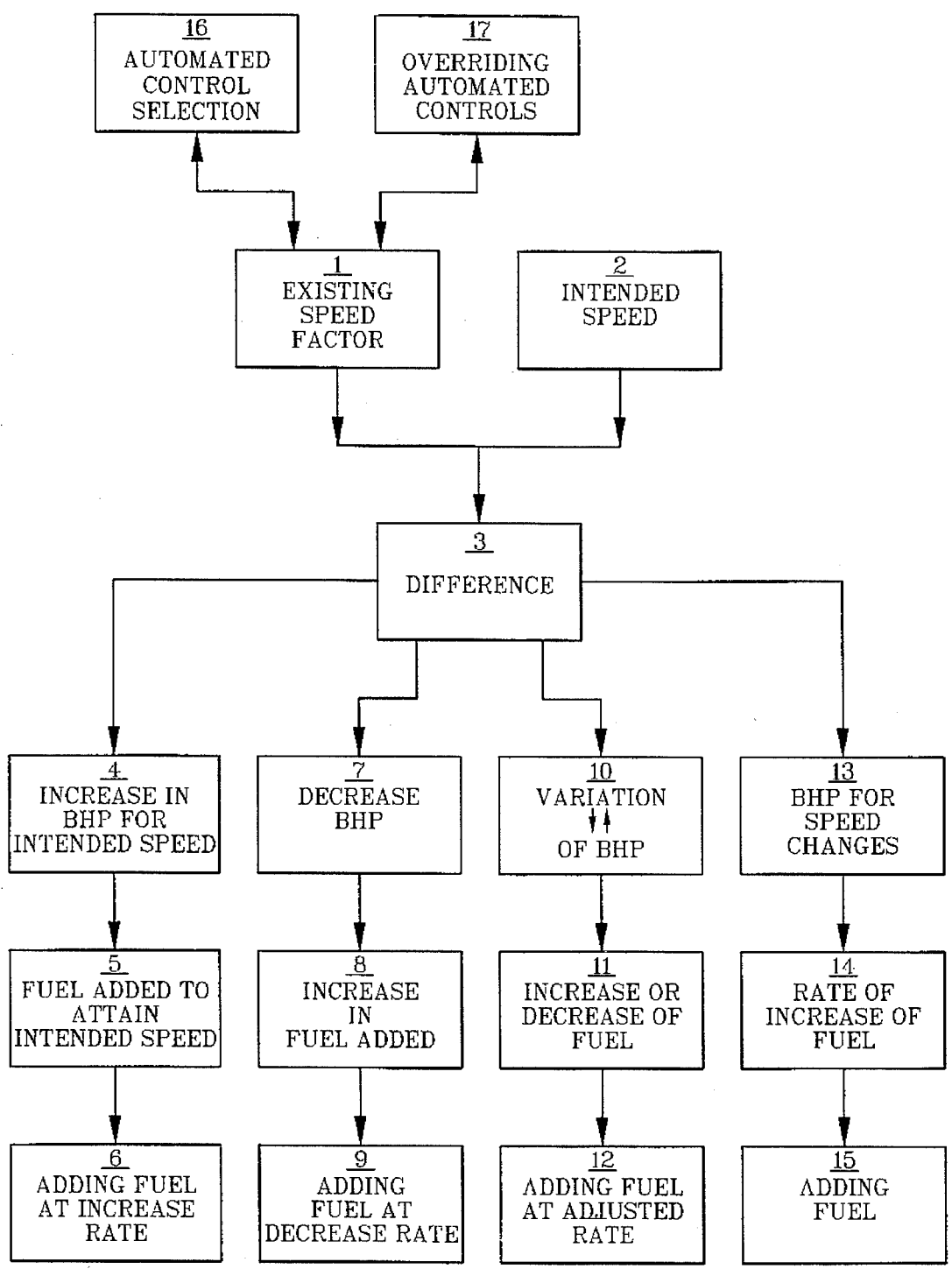
FIG. 1 is a flow diagram of the method.

Reference is made first to FIG. 1. A first step in this method for computerized control of speed of a motor vehicle is ascertaining a motor-vehicle's existing speed factor 1. The existing speed factor can be at a highway speed level, stopped at zero speed factor or some place in between zero speed factor and highway speed level. The next step is selecting an intended speed 2. The intended speed can be higher or lower than an existing speed that is above zero speed factor. The next step is determining difference between intended speed and existing speed 3 of the motor vehicle. Step 4 is calculating increase in brake horsepower to attain intended speed from the existing speed factor. Step 5 is calculating rate of increase in fuel added to an engine to attain the intended speed of the motor vehicle. Step 6 is adding the fuel to the engine at the increased rate.

Steps 1–6 are for attaining a higher speed than an existing speed factor. Under normal driving conditions, this is a major use of the invention. Steps 4 and 5 are based on increasing horsepower and fuel added at rates designed to maximize fuel efficiency and to minimize exhaust smog of the engine. Predetermined criteria and standards can be used as guides for particular engines in particular use conditions for achieving the objectives of steps 1–6.

Decreasing speed to lower levels than existing speed at rates that optimize fuel efficiency and minimize exhaust smog is an aspect of this method. It utilizes calculations of speed differences from step 3 for step 7 which is calculating decrease in brake horsepower to attain intended speed from an existing speed factor. Step 8 then is calculating rate of decrease in fuel added to an engine of the motor vehicle for maximizing fuel efficiency and minimizing exhaust smog. Step 9 is adding the fuel to the engine at the decreased rate.

Maintaining an intended speed for a cruise-control mode which maximizes fuel efficiency and minimizes exhaust smog requires step 10 which is calculating variation up or down in brake horsepower in proportion to at least one gear ratio of a transmission to maintain intended speed by compensating for changes in existing speed resulting from variables in ambient conditions. Then step 11, calculating rate of increase or decrease in fuel added to the engine is to maximize fuel efficiency and minimize exhaust smog is employed. Adding fuel to the engine at an adjusted rate is step 12.

Starting from an existing speed factor of zero or near zero in a stopped or near-stopped condition, step 13 is calculating brake horsepower for speed changes in relation to gear ratios between zero speed factor and intended speed. Step 14 is calculating rate of increase in fuel added in relation to gear ratios successively to maximize fuel efficiency and minimize exhaust smog between zero speed factor and intended speed. Step 15 is adding fuel in relation to gear ratios successively to maximize fuel efficiency and minimize exhaust smog between zero speed factor and intended speed.

Included in this method are selecting automated controls, step 16, and overriding automated controls, step 17. Steps 16 and 17 can be employed at any speed factor.

This method is applicable to transmissions with either manual or automatic shifting. A transmission is considered to be continuously variable whether with manual or automatic means. The steps are the same for either. It is applicable also to an infinitely variable transmission, such as a variable-position belt drive.

Figure 2:
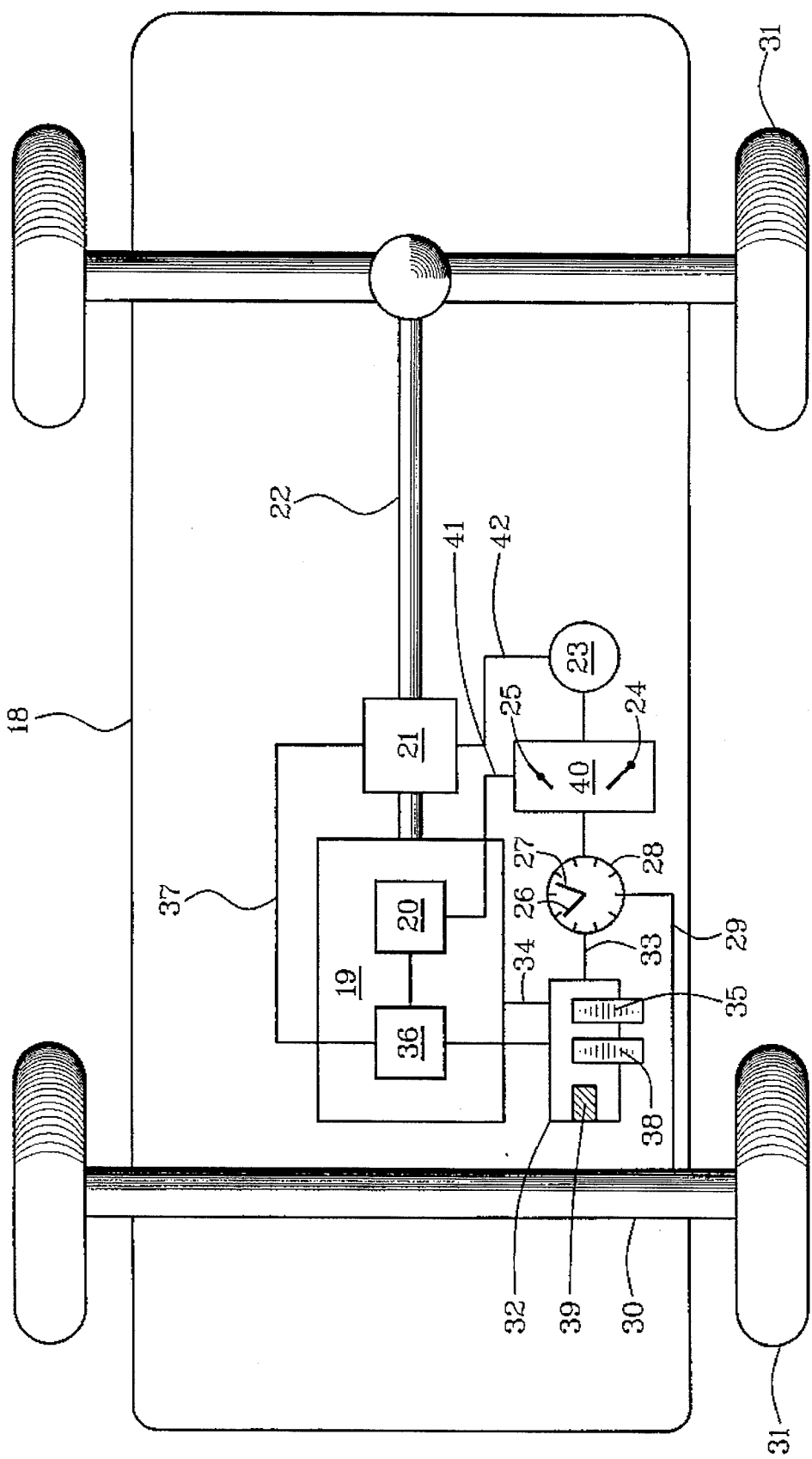
FIG. 2 is a schematic plan view of the control system in relationship to a vehicle, a vehicle engine, and a vehicle transmission.

Referring to FIG. 2, a system to operate this method has a motor vehicle 18 with a vehicle engine 19 having a throttle means 20 and a continuously variable transmission 21 that delivers power through a drive shaft 22. The continuously variable transmission 21 can be any type of transmission that can be varied in digital or analog gear ratio by any manual or automatic means. The throttle means 20 can be any type of carburetor, pre-compression injection or post-compression injection means for adding fuel to a heat engine of any type.

To operate the system, a driver 23 merely selects an intended speed with either a foot-pedal selector 24 or a hand selector 25. Intended speed 26 can be indicated separately from existing speed factor 27 on a selection speedometer 28. Existing speed factor 27 is communicated to the selection speedometer 28 by a speedometer line 29 from an axle 30 rotated by a wheel 31 on the motor vehicle 18 or by such other conventional means for registering speed of a vehicle on a speedometer.

Intended speed 26 and existing speed factor 27 are communicated to a speed-control calculator 32 through a selector-communication means 33. Rotational speed and brake horsepower being generated by the vehicle engine 19 are communicated to the speed-control calculator 32 through a power-communication line 34.

The speed-control calculator 32 has a computer program 35 for programming actuation control to an actuator 36 which actuates the throttle means 20 and the continuously variable transmission 21. The actuator 36 in combination with a gearing-communication line 37 is also an automatic computer-controlled gear selector. The computer program 35 is adaptable to various vehicle engines, motor vehicles and combinations thereof by a means such as a computer-program card 38 that is designed to indicate adjustment rate of addition of fuel to at least one particular class and size of vehicle engines for maximizing fuel efficiency and minimizing exhaust smog in particular use conditions. The means for adapting the computer program to various vehicle engines, motor vehicles and combinations thereof can be a sub-program 39 of the speed-control calculator 32 designed to adjust parameters of calculation to indicate adjustment of rate of addition of fuel to at least one particular class and size of vehicle engines for maximizing fuel efficiency and minimizing exhaust smog in particular use conditions.

This computerized method and system for controlling automobile speed variation and related shifting can be overridden by direct control of the throttle means 20 through a selection station 40 with a throttle-control line 41. For overriding automation of speed control and related gear shifting for particular types of automatic transmissions, the foot-pedal selector 24 and the hand selector 25 are employed to operate the throttle means 20 directly. The continuously variable transmission 21 can be operated directly by the driver 23 through a direct shifting means 42 represented by a line from the driver 23 to the continuously variable transmission 21. Some types of continuously variable transmissions 21 are operable directly by the driver 23 with various means regardless of whether the throttle means 20 is operated by the speed-control calculator 32 and the actuator 36 for optimal control of speed and horsepower as described above.

The method and system of the present invention can be applied to any engine using different fuels, whether the fuel be gasoline, diesel or electricity. For gasoline engine driven vehicles, the throttle opening (or angle), added fuel rate and transmission gear ratio are controlled simultaneously to achieve the desired vehicle speed at the desired rate with maximum fuel efficiency and minimum exhaust smog. For diesel engine driven vehicles, the fuel injection rate and the transmission gear ratio are controlled simultaneously to achieve the desired vehicle speed at the desired rate with maximum fuel efficiency and minimum exhaust smog. For electric-motor driven vehicles, the electric current and voltage and the transmission gear ratio are controlled simultaneously for maximum efficiency in electric power use at the desired vehicle speed and in the process of achieving the desired vehicle speed at the desired rate of change of speed.

A new and useful computerized method and system for controlling automobile speed variation with maximum engine efficiency having been described, all such modifications, adaptations, substitutions of equivalents, combinations of parts, applications and forms thereof as described by the following claims are included in this invention.

We claim:

1. A method comprised of the following steps for computerized control and continuous variation of speed of a motor vehicle:

ascertaining the motor-vehicle's existing speed factor;

selecting an intended speed for the motor vehicle on a continuous basis by a driver-operated selector;

determining difference of the intended speed from the motor-vehicle's existing speed factor;

calculating brake horsepower required of a vehicle engine to implement an optimal speed change and change rate to attain the intended speed of the motor vehicle with at least one predetermined gear ratio of a transmission positioned intermediate the vehicle engine and a vehicle drive shaft;

calculating increase in brake horsepower required of a vehicle engine to implement the optimal speed change and change rate to attain the intended speed from the existing speed factor with at least one predetermined gear ratio of the transmission;

calculating rate of increase in fuel added to the vehicle engine to achieve rotational speed and related brake horsepower of the vehicle engine in order to attain the intended speed from the existing speed factor with optimum efficiency and minimization of exhaust smog of the vehicle engine; and adding fuel to the vehicle engine at an increased rate calculated to attain the intended speed from the existing speed factor with select efficiency and minimization of exhaust smog of the vehicle engine.

2. A method as described in claim 1 wherein the existing speed factor of the motor vehicle is zero and further comprising:

calculating increase in brake horsepower required of the vehicle engine to attain the intended speed from zero speed factor for a first of a plurality of gear ratios and for each of the plurality of gear ratios of the transmission successively;

calculating rate of increase in fuel added to the vehicle engine to achieve rotational speed and related brake horsepower of the vehicle engine for the first of the plurality of gear ratios and for each of the plurality of gear ratios of the transmission successively in order to attain the intended speed from zero speed factor with optimum efficiency and minimization of exhaust smog of the vehicle engine; and adding fuel to the vehicle engine at an increased rate calculated to attain the intended speed from zero speed factor with select efficiency and minimization of exhaust smog of the vehicle engine.

3. A method as described in claim 1 wherein the transmission is a continuously variable transmission and further comprising:

calculating increase in brake horsepower required of a vehicle engine to attain the intended speed from the existing speed factor with at least one predetermined gear ratio of the continuously variable transmission.

4. A method as described in claim 1 wherein the transmission is a continuously variable transmission, existing speed factor of the motor vehicle is zero and further comprising:

calculating increase in brake horsepower required of the vehicle engine to attain the intended speed from zero speed factor for a first of a plurality of gear ratios and for each of the plurality of gear ratios of the continuously variable transmission successively;

calculating rate of increase in fuel added to the vehicle engine to achieve rotational speed and related brake horsepower of the vehicle engine for the first of the plurality of gear ratios and for each of the plurality of gear ratios of the continuously variable transmission successively in order to attain the intended speed from zero speed factor with optimum efficiency and minimization of exhaust smog of the vehicle engine; and adding fuel to the vehicle engine at an increased rate calculated to attain the intended speed from zero speed factor with select efficiency and minimization of exhaust smog of the vehicle engine.

5. A method as described in claim 1 wherein the existing speed factor of the motor vehicle is proximate the intended speed and further comprising:

calculating change in brake horsepower required of the vehicle engine to attain the intended speed from any variation of existing speed factor due to change in ambient conditions with at least one predetermined gear ratio of the transmission;

calculating rate of change in fuel added to the vehicle engine to achieve rotational speed and related brake horsepower of the vehicle engine in order to minimize variation of the intended speed with optimum efficiency and minimization of exhaust smog of the vehicle engine; and adding fuel to the vehicle engine at a changed rate calculated to attain the intended speed from any variation in existing speed factor with select efficiency and minimization of exhaust smog of the vehicle engine.

6. A method as described in claim 1 wherein the transmission is a continuously variable transmission, existing speed factor of the motor vehicle is proximate the intended speed and further comprising:

calculating change in brake horsepower required of the vehicle engine to attain the intended speed from any variation of existing speed factor due to change in ambient conditions with at least one predetermined gear ratio of the continuously variable transmission;

calculating rate of change in fuel added to the vehicle engine to achieve rotational speed and related brake horsepower of the vehicle engine in order to minimize variation of the intended speed with optimum efficiency and minimization of exhaust smog of the vehicle engine; and adding fuel to the vehicle engine at a changed rate calculated to attain the intended speed from any variation in existing speed factor with select efficiency and minimization of exhaust smog of the vehicle engine.

7. A system for control of speed to maximize efficiency and minimize exhaust smog of a vehicle engine for a motor vehicle comprising:

a throttle means in controllable-fuel-supply relationship to the vehicle engine;

a speed-control computer in actuator relationship to the throttle means of the vehicle engine on the motor vehicle;

a speed selector articulated and positioned for operation by a driver of the motor vehicle in computer-communicative relationship to the speed-control computer;

a computer program with which the speed-control computer is designed to actuate the throttle means to attain rotational speeds and rates of rotational changes of speeds of the vehicle engine in accordance with predetermined guides for maximizing fuel efficiency and minimizing exhaust smog of the vehicle engine; and a means for adjustment of the computer program by the driver to achieve select levels of optimization of rates of rotational changes of speeds of the vehicle engine for maximizing fuel efficiency and minimizing exhaust smog of the motor vehicle.

8. A system as described in claim 7 and further comprising:

a speedometer display means for displaying any difference between intended speed and actual speed of the motor vehicle.

9. A system for control of speed to maximize efficiency and minimize exhaust smog of a vehicle engine for a motor vehicle comprising:

a throttle means in controllable-fuel-supply relationship to the vehicle engine;

a speed-control computer in actuator relationship to the throttle means of the vehicle engine on the motor vehicle;

a speed selector articulated and positioned for operation by a driver of the motor vehicle in computer-communicative relationship to the speed-control computer;

a computer program with which the speed-control computer is designed to actuate the throttle means to attain rotational speeds and rates of rotational changes of speeds of the vehicle engine in accordance with predetermined guides for maximizing fuel efficiency and minimizing exhaust smog of the vehicle engine; and wherein the computer program is designed to coordinate speed changes and rates of speed changes selectively by the speed-control computer in relation to gearing ratios of a transmission positioned intermediate the vehicle engine and a vehicle drive shaft.

10. A system as described in claim 9 wherein the transmission is a continuously variable transmission and further comprising:

an automatic gear selector in gearing-control relationship to the continuously variable transmission for actuating changes of the gearing ratios in relation to speeds of the vehicle engine and speeds of the motor vehicle in accordance with predetermined guides for maximizing fuel efficiency and minimizing exhaust smog of the vehicle engine.

11. A system as described in claim 9 and further comprising:

a computer-controlled gear selector in gearing-control relationship to the transmission for actuating changes of the gearing ratios in relation to speeds of the vehicle engine and speeds of the motor vehicle in accordance with predetermined guides for maximizing fuel efficiency and minimizing exhaust smog of the vehicle engine.

12. A system as described in claim 11 and further comprising:

a speedometer display means for displaying any difference between intended speed and actual speed of the motor vehicle.

13. A system for control of speed to maximize efficiency and minimize exhaust smog of a vehicle engine for a motor vehicle comprising:

a throttle means in controllable-fuel-supply relationship to the vehicle engine;

a speed-control computer in actuator relationship to the throttle means of the vehicle engine on the motor vehicle;

a speed selector articulated and positioned for operation by a driver of the motor vehicle in computer-communicative relationship to the speed-control computer;

a computer program with which the speed-control computer is designed to actuate the throttle means to attain rotational speeds and rates of rotational changes of speeds of the vehicle engine in accordance with predetermined guides for maximizing fuel efficiency and minimizing exhaust smog of the vehicle engine; and a means for adapting the computer program to various vehicle engines, motor vehicles and combinations thereof.

14. A system as described in claim 13 wherein:

the means for adapting the computer program to various vehicle engines, motor vehicles and combinations thereof is a computer-program card designed to indicate adjustment of rate of addition of fuel to at least one particular class and size of vehicle engines for maximizing fuel efficiency and minimizing exhaust smog in particular use conditions.

15. A system as described in claim 14 wherein:

the computer-program card is designed to be positioned in the speed-control computer for calculating adjustment of rate of addition of fuel to at least one particular class and size of vehicle engines for maximizing fuel efficiency and minimizing exhaust smog in particular use conditions.

16. A system as described in claim 13 wherein:

the means for adapting the computer program to various vehicle engines, motor vehicles and combinations thereof is a sub-program of the computer program designed to adjust parameters of calculation to indicate adjustment of rate of addition of fuel to at least one particular class and size of vehicle engines for maximizing fuel efficiency and minimizing exhaust smog in particular use conditions.

\* \* \* \* \*